US011130356B2

(12) United States Patent
Shiiya et al.

(10) Patent No.: US 11,130,356 B2
(45) Date of Patent: Sep. 28, 2021

(54) DETECTION DEVICE AND PRINTING APPARATUS

(71) Applicant: SEIKO EPSON CORPORATION, Tokyo (JP)

(72) Inventors: Tomoyuki Shiiya, Matsumoto (JP); Yuya Kandabayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 16/791,048

(22) Filed: Feb. 14, 2020

(65) Prior Publication Data

US 2020/0262218 A1 Aug. 20, 2020

(30) Foreign Application Priority Data

Feb. 15, 2019 (JP) .............................. JP2019-025246

(51) Int. Cl.
*B41J 11/46* (2006.01)
*B41J 11/00* (2006.01)
*H04N 1/00* (2006.01)

(52) U.S. Cl.
CPC .............. *B41J 11/46* (2013.01); *B41J 11/007* (2013.01); *B41J 11/008* (2013.01); *B41J 11/0095* (2013.01); *H04N 1/0071* (2013.01); *H04N 1/00734* (2013.01)

(58) Field of Classification Search
CPC ... B41J 11/0095; B41J 29/393; B65H 43/008; G03G 15/5062; G03G 15/652; H04N 1/0071; H04N 1/00734; H04N 1/00761
See application file for complete search history.

(56) References Cited

U.S. PATENT DOCUMENTS

2010/0243697 A1 9/2010 Aoki

FOREIGN PATENT DOCUMENTS

| JP | 2010-228168 | 10/2010 |
| JP | 2013-193305 | 9/2013 |

*Primary Examiner* — Julian D Huffman
(74) *Attorney, Agent, or Firm* — Workman Nydegger

(57) ABSTRACT

A detection device including a first belt stretched over a first pulley and a second pulley, a first sensor being fixed to the first belt, a second belt stretched over a third pulley and a fourth pulley to be arranged in parallel to the first belt, a second sensor being fixed to the second belt, a drive unit configured to generate a driving force for moving the first belt and the second belt, a first rotation shaft, the first pulley being fixed to the first rotation shaft, a second rotation shaft, the third pulley being fixed to the second rotation shaft, and a coupling unit configured to couple the first rotation shaft with the second rotation shaft, in which the coupling unit is configured to adjust an angle as viewed from an axial direction of one of the first rotation shaft and the second rotation shaft.

10 Claims, 9 Drawing Sheets

DETECTION DEVICE AND PRINTING APPARATUS

The present application is based on, and claims priority from JP Application Serial Number 2019-025246, filed Feb. 15, 2019, the disclosure of which is hereby incorporated by reference herein in its entirety.

BACKGROUND

1. Technical Field

The disclosure relates to a detection device and a printing apparatus.

2. Related Art

In the related art, there are used detection devices configured to detect, using a sensor, an object to be detected such as an end portion of a medium being transported or a mark formed on a medium. Among the detection devices, a detection device includes a plurality of sensors configured to detect an object to be detected. For example, JP 2010-228168 A discloses a medium transport device including two sensor units configured to detect a mark formed on a communication paper.

Unfortunately, in a detection device including a plurality of sensors configured to detect an object to be detected, an error may occur between a detection result of a first sensor among the plurality of sensors and a detection result of a second sensor among the plurality of sensors. The error may be caused due to a deviation in a relative positional relationship between the first sensor and the second sensor. Note that JP 2010-228168 A does not give a description about an error in the detection results of the two sensor units, and does not give a description about a configuration for reducing the error, such as a configuration for adjusting a relative positional relationship between the two sensor units.

SUMMARY

A detection device according to the present disclosure for resolving the above-described issue includes a first belt stretched over a first pulley and a second pulley, a first sensor being fixed to the first belt, a second belt stretched over a third pulley and a fourth pulley to be arranged in parallel to the first belt, a second sensor being fixed to the second belt, a drive unit configured to generate a driving force for moving the first belt and the second belt, a first rotation shaft configured to transmit the driving force to the first pulley, the first pulley being fixed to the first rotation shaft, a second rotation shaft configured to transmit the driving force to the third pulley, the third pulley being fixed to the second rotation shaft, and a coupling unit configured to couple the first rotation shaft with the second rotation shaft in an axial direction, in which the coupling unit is configured to adjust an angle as viewed from an axial direction of at least one of the first rotation shaft and the second rotation shaft.

DESCRIPTION OF EXEMPLARY EMBODIMENTS

Figure 1:
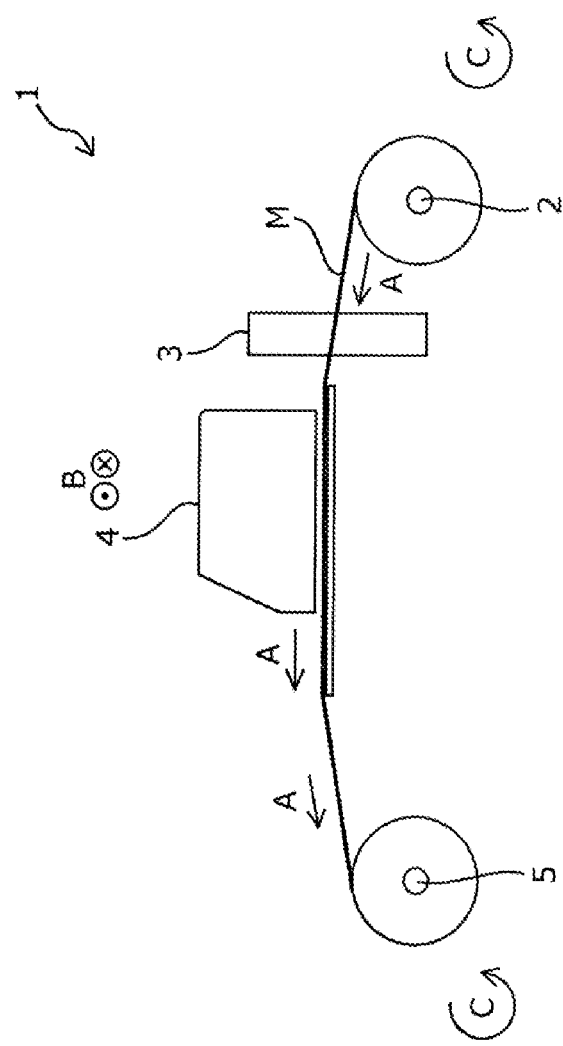
FIG. 1 is a side view schematically illustrating a printing apparatus according to Example 1 of the present disclosure.

First, the present disclosure will be schematically described.

A detection device according to a first aspect of the present disclosure for resolving the above-described issue includes a first belt stretched over a first pulley and a second pulley, a first sensor being fixed to the first belt, a second belt stretched over a third pulley and a fourth pulley to be arranged in parallel to the first belt, a second sensor being fixed to the second belt, a drive unit configured to generate a driving force for moving the first belt and the second belt, a first rotation shaft configured to transmit the driving force to the first pulley, the first pulley being fixed to the first rotation shaft, a second rotation shaft configured to transmit the driving force to the third pulley, the third pulley being fixed to the second rotation shaft, and a coupling unit configured to couple the first rotation shaft with the second rotation shaft in an axial direction, in which the coupling unit is configured to adjust an angle as viewed from an axial direction of at least one of the first rotation shaft and the second rotation shaft.

According to the first aspect, the first rotation shaft configured to move the first belt to which the first sensor is fixed and the second rotation shaft configured to move the second belt to which the second sensor is fixed, are configured to be adjustable in angles as viewed from the axial direction. This allows a relative position between the first sensor and the second sensor to be adjusted. Accordingly, the relative position between the first sensor and the second sensor can be adjusted to suppress an error in the detection results of the first sensor and the second sensor.

A second aspect of the present disclosure provides a detection device in which, in the first aspect, the coupling unit includes a screw for fixing the first rotation shaft and the second rotation shaft to the coupling unit, and the coupling unit is configured such that the screw is unfastened to adjust an angle as viewed from the axial directions of the first rotation shaft and the second rotation shaft with respect to the coupling unit.

According to the second aspect, one piece of screw is fastened to fix the first rotation shaft and the second rotation shaft with ease, and the one piece of screw is unfastened to adjust angles as viewed from the axial directions of the first rotation shaft and the second rotation shaft. That is, a user-friendly configuration is achieved in which the first sensor and the second sensor can be moved by a fastening operation of one piece of screw.

A third aspect of the present disclosure provides a detection device in which, in the first aspect, the coupling unit includes a first screw for fixing the first rotation shaft to the coupling unit and a second screw for fixing the second rotation shaft to the coupling unit, and the coupling unit is configured such that an angle as viewed from the axial direction of the first rotation shaft with respect to the coupling unit is adjustable when the first screw is unfastened, and the coupling unit is configured such that the second screw is unfastened to adjust an angle as viewed from the axial direction of the second rotation shaft with respect to the coupling unit.

According to the third aspect, the angles as viewed from the axial directions of the first rotation shaft and the second rotation shaft with respect to the coupling unit can be individually adjusted with the first screw and the second screw. This allows one of the first sensor or the second sensor to be moved without inadvertently allowing the other to move.

A fourth aspect of the present disclosure provides a detection device including a first belt stretched over a first pulley and a second pulley, the first belt being provided with a first sensor with a first interposition unit interposed therebetween, a second belt stretched over a third pulley and a fourth pulley to be arranged in parallel to the first belt, the second belt being provided with a second sensor with a second interposition unit interposed therebetween, a drive unit configured to generate a driving force for moving the first belt and the second belt, and a rotation shaft configured to transmit the driving force to the first pulley and the third pulley, the first pulley and the third pulley being fixed to the rotation shaft, in which the first interposition unit is configured to adjust a position of the first sensor in an extending direction of the first belt, the second interposition unit is configured to adjust a position of the second sensor in an extending direction of the second belt, or the first interposition unit is configured to adjust a position of the first sensor in an extending direction of the first belt and the second interposition unit is configured to adjust a position of the second sensor in an extending direction of the second belt.

According to the fourth aspect, the position of the first sensor is adjusted with the first interposition unit, the position of the second sensor is adjusted with the second interposition unit, or the position of the first sensor is adjusted with the first interposition unit and the position of the second sensor is adjusted with the second interposition unit, to thus adjust a relative position between the first sensor and the second sensor. Accordingly, the relative position between the first sensor and the second sensor can be adjusted to suppress an error in the detection results of the first sensor and the second sensor.

A fifth aspect of the present disclosure provides a detection device in which, in the fourth aspect, the first interposition unit is configured to adjust a position of the first sensor in an extending direction of the first belt and the second interposition unit is configured to adjust a position of the second sensor in an extending direction of the second belt.

According to the fifth aspect, the position of the first sensor can be adjusted with the first interposition unit and the position of the second sensor can be adjusted with the second interposition unit. This allows a relative position between the first sensor and the second sensor to be adjusted with high accuracy.

A sixth aspect of the present disclosure provides a detection device including a first belt stretched over a first pulley and a second pulley, a first sensor being fixed to the first belt, a second belt stretched over a third pulley and a fourth pulley to be arranged in parallel to the first belt, a second sensor being fixed to the second belt, a drive unit configured to generate a driving force for moving the first belt and the second belt, and a rotation shaft configured to transmit the driving force to the first pulley and the third pulley, the first pulley and the third pulley being fixed to the rotation shaft, in which the first pulley is configured to be, with respect to the rotation shaft, in a fixed state and in an angle adjustable state in which an angle as viewed from an axial direction is adjustable, the third pulley is configured to be, with respect to the rotation shaft, in a fixed state and in an angle adjustable state in which an angle as viewed from an axial direction is adjustable, or the first pulley is configured to be, with respect to the rotation shaft, in a fixed state and in an angle adjustable state in which an angle as viewed from an axial direction is adjustable and the third pulley is configured to be, with respect to the rotation shaft, in a fixed state and in an angle adjustable state in which an angle as viewed from an axial direction is adjustable.

According to the sixth aspect, the first pulley is caused to rotate relative to the rotation shaft, the third pulley is caused to rotate relative to the rotation shaft, or the first pulley is caused to rotate relative to the rotation shaft and the third pulley is caused to rotate relative to the rotation shaft, to thus adjust a relative position between the first sensor and the second sensor. Accordingly, the relative position between the first sensor and the second sensor can be adjusted to suppress an error in the detection results of the first sensor and the second sensor.

A seventh aspect of the present disclosure provides a detection device in which, in the sixth aspect, the first pulley is configured to be, with respect to the rotation shaft, in a fixed state and in an angle adjustable state in which an angle as viewed from an axial direction is adjustable and the third pulley is configured to be, with respect to the rotation shaft, in a fixed state and in an angle adjustable state in which an angle as viewed from an axial direction is adjustable.

According to the seventh aspect, the first pulley can be rotated relative to the rotation shaft and the third pulley can be rotated relative to the rotation shaft. This allows a relative position between the first sensor and the second sensor to be adjusted with high accuracy.

An eighth aspect of the present disclosure provides a detection device in which, in any one of the first to seventh aspects, a reference position sensor configured to serve as a reference for a positional adjustment of the first sensor and the second sensor is provided.

According to the eighth aspect, the provision of the reference position sensor allows the first sensor and the second sensor to be disposed at particularly preferred positions. This suppresses an error in the detection results of the first sensor and the second sensor in a particularly effective manner.

A ninth aspect of the present disclosure provides a detection device in which, in any one of the first to eighth aspects, the first pulley and the third pulley, and attachment positions for the first pulley and the third pulley are to be attached, respectively, are each provided with a flat portion, in which the first pulley is attached to the attachment position for the first pulley with the flat portions facing each other, and the third pulley is attached to the attachment position for the third pulley with the flat portions facing each other.

According to the ninth aspect, the first pulley and the third pulley are attached to the attachment positions of the first pulley and the third pulley, respectively, with the flat portions facing each other. This prevents the first pulley and the third pulley from being inadvertently rotated relative to the rotation shaft, to thus suppress an occurrence of an error in the detection results of the first sensor and the second sensor.

A tenth aspect of the present disclosure provides a printing apparatus including a detection device according to any one of the first to ninth aspects, and a printing unit configured to perform printing onto a medium on which a detection operation is performed with the detection device.

According to the tenth aspect, an error in the detection results of the first sensor and the second sensor is suppressed, to thus perform printing onto a medium on which a detection operation has been performed with high detection accuracy.

Preferred embodiments of the present disclosure will be described below with reference to the accompanying drawings.

EXAMPLE 1 (FIGS. 1 TO 5)

First, an outline of a printing apparatus 1 of Example 1 will be described below with reference to FIG. 1.

As illustrated in FIG. 1, the printing apparatus 1 of Example 1 includes a feeding-out section 2 configured to cause a medium M in a roll form to be set and rotated in a rotation direction C to feed out the medium M. The medium M fed out from the feeding-out section 2 is transported in a transport direction A. Note that transport mechanisms with various configurations can be used, without being particularly limited to a specific transport mechanism, such as a transport mechanism in which a transport roller configured to rotate with being in contact with the medium M is used, a transport mechanism in which an adsorption drum configured to rotate with absorbing the medium M is used, and a transport mechanism configured to rotate a transport belt having an endless shape with causing the transport belt to support the medium M. The medium M being transported in the transport direction A is detected at both end portions in a width direction B of the medium M and at marks formed on the medium M, by a first sensor 10A and a second sensor 10B in a detection device 3, which serve as a plurality of sensors that will be described below.

The medium M, on which the detection operation has been performed by the detection device 3, is formed an image by discharging ink from a head 4 as a printing unit in accordance with the transport in the transport direction A. The medium M on which an image has been formed by discharging ink from the head 4 is wound into a roll shape by a rotation of a winding unit 5 in the rotation direction C.

Note that the printing apparatus 1 of Example 1 is a so-called "serial printer", which is configured to perform printing while alternately repeating a transport by a predetermined amount of the medium M and a back-and-forth movement in the width direction B of the head 4. However, the printing apparatus 1 may also be a so-called line printer that uses a line head as the printing unit, where the line head includes nozzles linearly aligned along the width direction B of the medium M, to continuously perform printing while continuously transporting the medium M. Moreover, the printing apparatus may be a printing apparatus that includes a printing unit having a configuration different from that of a printing unit of a so-called ink jet printing scheme configured to discharge ink to perform printing.

As described above, the printing apparatus 1 of Example 1 includes the detection device 3. Details of the detection device 3 will be described later. The printing apparatus 1 of Example 1 is configured, by including the detection device 3, to perform printing onto the medium M on which a detection operation has been performed with high detection accuracy.

Next, a detailed configuration of the detection device 3, which is a main part of the printing apparatus 1 of Example 1, will be described in detail below with reference to FIGS. 2 to 5.

Figure 2:
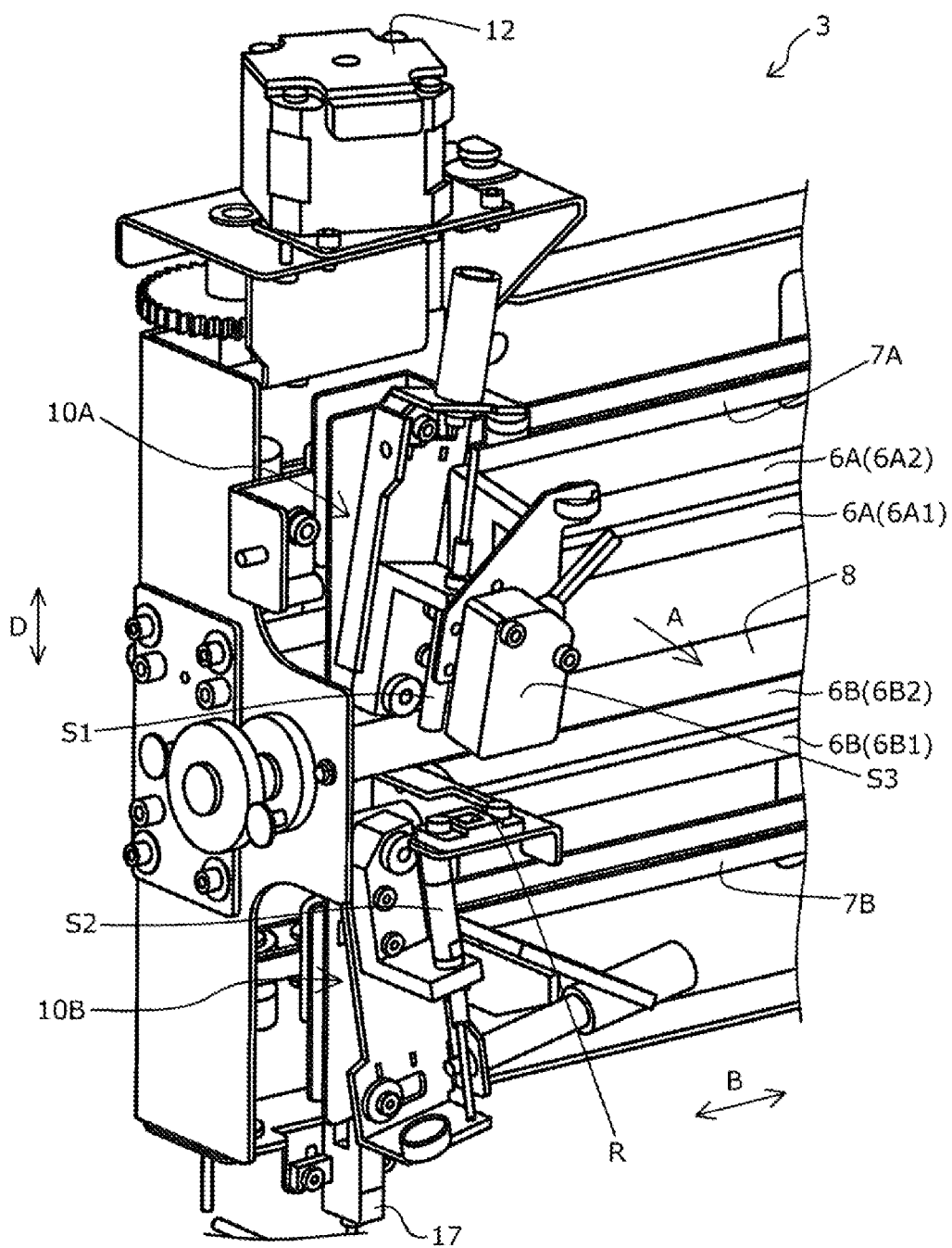
FIG. 2 is a perspective view illustrating one side in a width direction of a detection device in a printing apparatus according to Example 1 of the present disclosure.
Figure 3:
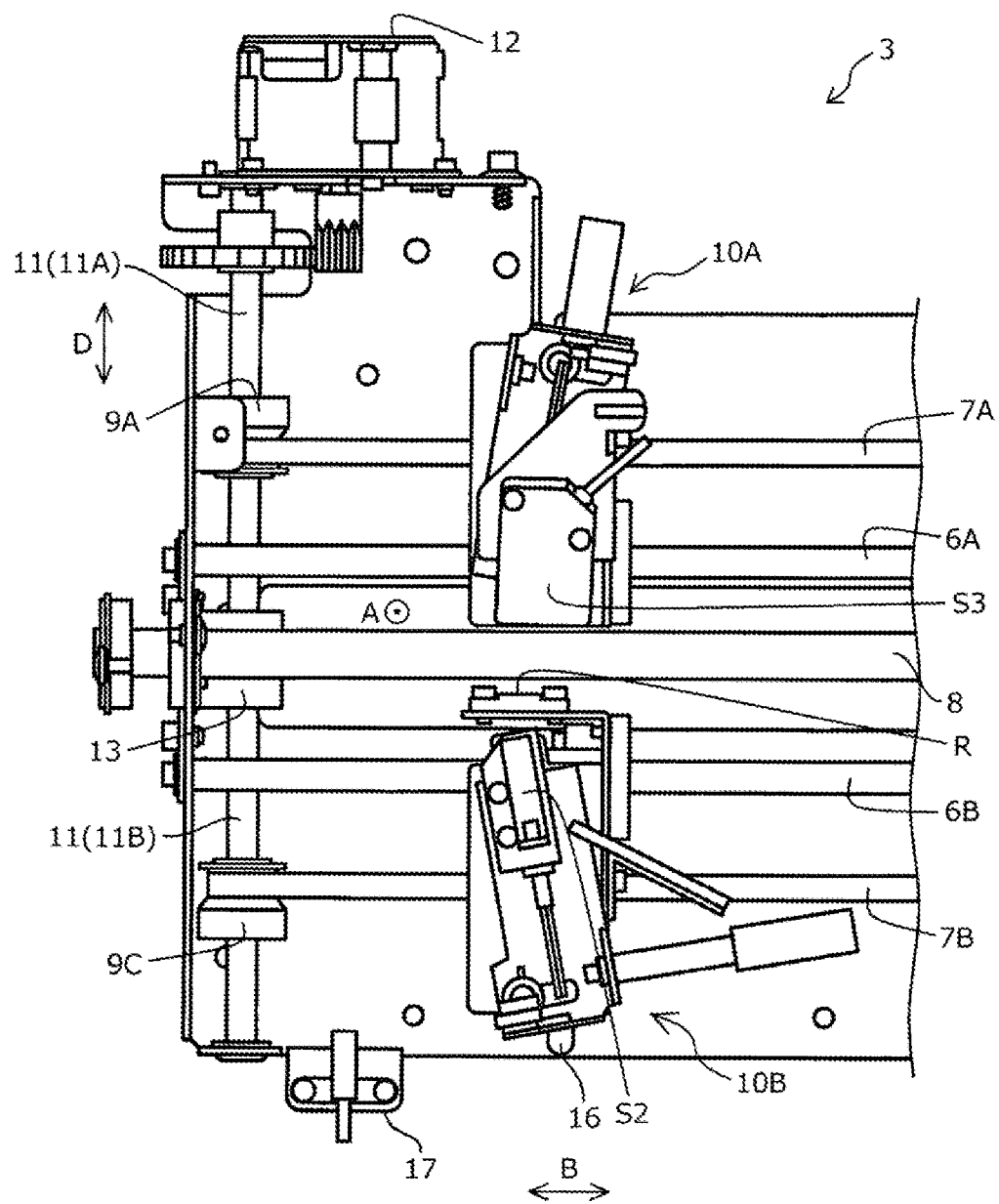
FIG. 3 is a front view illustrating one side in a width direction of a detection device in a printing apparatus according to Example 1 of the present disclosure.

As illustrated in FIGS. 2 and 3, the detection device 3 of Example 1 includes a transport roller 8 configured to transport the medium M, the first sensor 10A attached to a guide bar 6A provided extending in the width direction B, and the second sensor 10B attached to a guide bar 6B provided extending in the width direction B. Note that the guide bar 6A is constituted by a main bar 6A1 through which the first sensor 10A is attached, and a sub bar 6A2 configured to suppress a rotation of the first sensor 10A relative to the main bar 6A1. Similarly, the guide bar 6B is constituted by a main bar 6B1 through which the second sensor 10B is attached, and a sub bar 6B2 configured to suppress a rotation of the second sensor 10B relative to the main bar 6B1.

Figure 4:
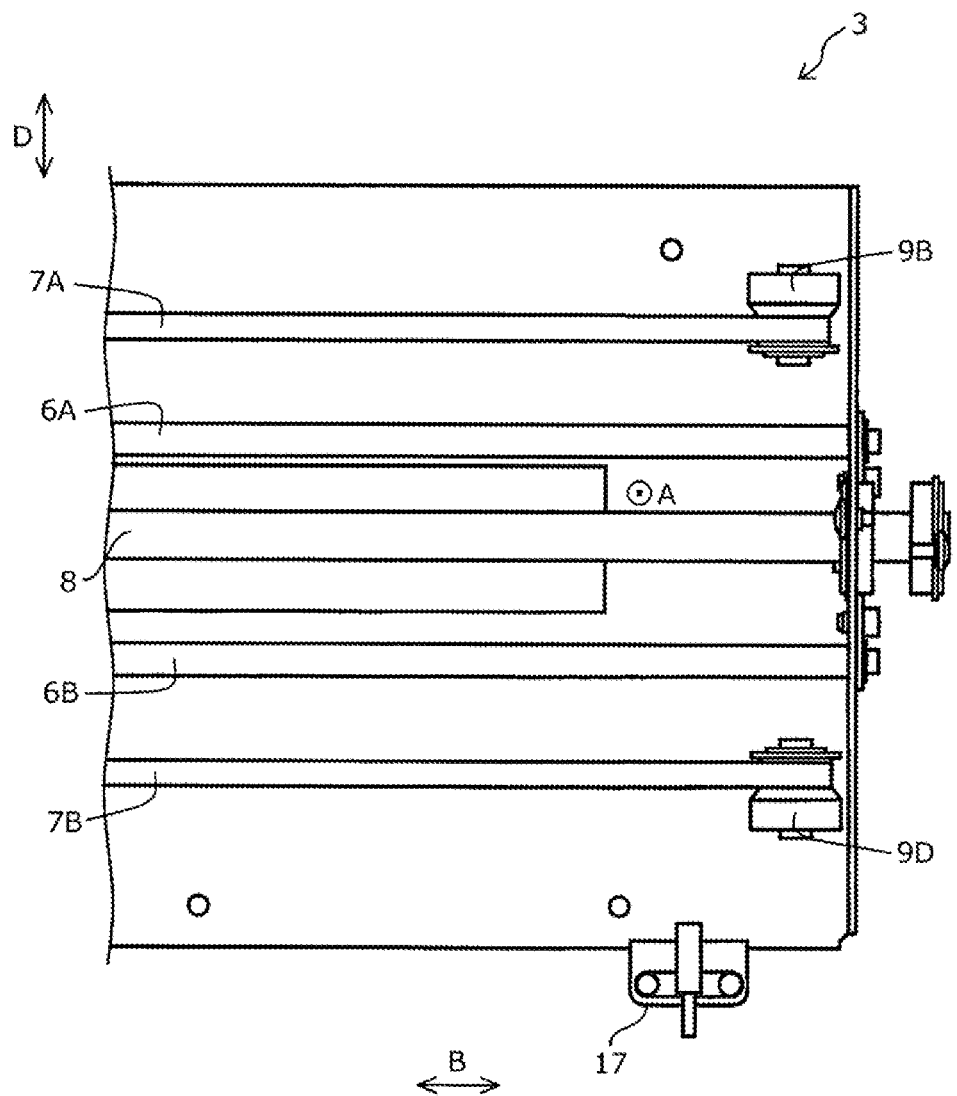
FIG. 4 is a front view illustrating the other side in a width direction of a detection device in a printing apparatus according to Example 1 of the present disclosure.

As illustrated in FIGS. 3, 4, and the like, the first sensor 10A, which is fixed to a first belt 7A stretched over a first pulley 9A and a second pulley 9B, is configured to move in the width direction B along the guide bar 6A by rotating the first pulley 9A and the second pulley 9B to rotate the first belt 7A having an endless shape. Further, as illustrated in FIGS. 3, 4, and the like, the second sensor 10B, which is fixed to a second belt 7B stretched over a third pulley 9C and a fourth pulley 9D, is configured to move in the width direction B along the guide bar 6B by rotating the third pulley 9C and the fourth pulley 9D to rotate the second belt 7B having an endless shape.

As illustrated in FIG. 2, a front-surface mark sensor S1 configured to detect a mark formed on a front surface, which is a surface on which printing is performed in the medium M, is formed on the first sensor 10A. In addition, the second sensor 10B is formed with a back-surface mark sensor S2 configured to detect a mark formed on a back surface on an opposite side of the front surface in the medium M. Further, the first sensor 10A is provided with a medium width sensor S3 equipped with an irradiation unit for light and a light-receiving sensor, and the second sensor 10B is provided with a reflection plate R configured to reflect the light. The medium width sensor S3 is configured to detect the width of the medium M by detecting a position at which the light is blocked by the medium M while causing the first sensor 10A and the second sensor 10B to move in the width direction B with synchronizing the first sensor 10A with the second sensor 10B.

As illustrated in FIG. 3, the first pulley 9A is provided on a first rotation shaft 11A being a rotation shaft 11. The first rotation shaft 11A is configured to rotate under the driving force of a drive motor 12. Further, the third pulley 9C is provided on a second rotation shaft 11B being the rotation shaft 11. The second rotation shaft 11B, which is coupled to the first rotation shaft 11A via a coupling unit 13, is configured to rotate in synchronization with the rotation of the first rotation shaft 11A. As such, the rotation shaft 11 provided on one side in the width direction B of the detection device 3 is constituted by the first rotation shaft 11A and the second rotation shaft 11B.

Figure 5:
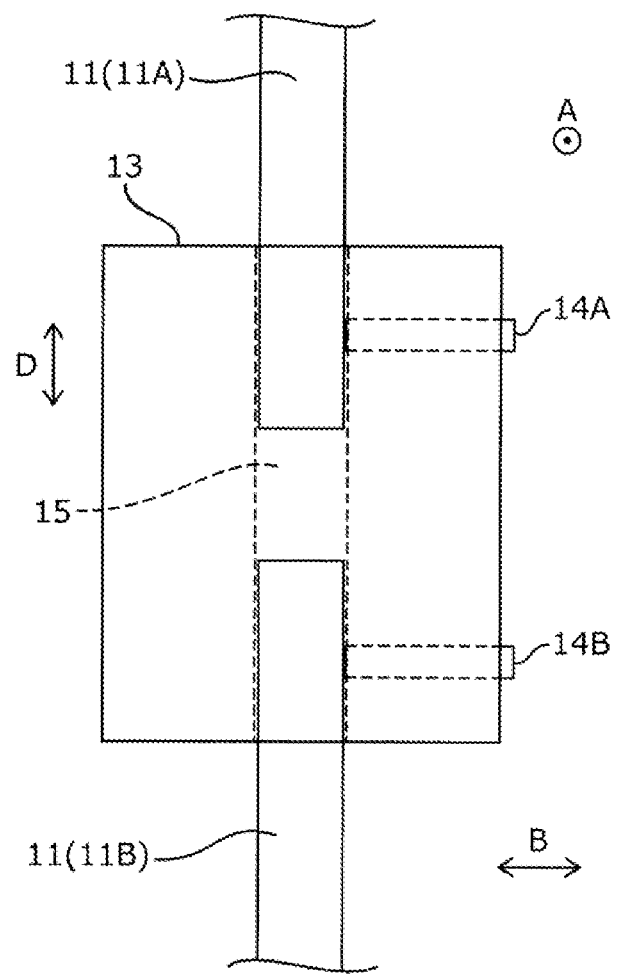
FIG. 5 is a schematic view as viewed from a direction intersecting an axial direction of a coupling unit of a detection device in a printing apparatus according to Example 1 of the present disclosure.

Here, as illustrated in FIG. 5 viewed from a direction intersecting an axial direction D of the rotation shaft 11, the coupling unit 13 includes a hole portion 15 having a cylindrical shape into which the first rotation shaft 11A and the second rotation shaft 11B are insertable. A first screw 14A, which passes through the hole portion 15, is fastened to fix the first rotation shaft 11A. A second screw 14B, which passes through the hole portion 15, is fastened to fix the second rotation shaft 11B. Note that the first screw 14A, which passes through the hole portion 15, is unfastened to attach/detach the first rotation shaft 11A to/from the coupling unit 13. The second screw 14B, which passes through the hole portion 15, is unfastened to attach/detach the second rotation shaft 11B to/from the coupling unit 13. The coupling unit 13 thus configured makes it possible to unfasten the first screw 14A and the second screw 14B to freely rotate the first rotation shaft 11A and the second rotation shaft 11B. Thus, at least one of the first rotation shaft 11A and the second rotation shaft 11B can be rotated to move at least one of the first belt 7A and the second belt 7B, to thus adjust a relative position between the first sensor 10A and the second sensor 10B.

Note that, as illustrated in FIG. 4, the second pulley 9B and the fourth pulley 9D are provided on the other side in the width direction B of the detection device 3. Also note that the second pulley 9B and the fourth pulley 9D are configured to rotate in a driven manner in accordance with the rotation of the first belt 7A and the second belt 7B, respectively.

Further, as illustrated in FIGS. 2 and 3, on the lower side of one side in the width direction B of the detection device 3, a reference position sensor 17 configured to acknowledge whether a light-blocking plate 16 provided on the second sensor 10B is located at the opposing position is provided. The reference position sensor 17, which includes an irradiation unit for light and a light-receiving sensor, is configured, by whether the light emitted from the reference position sensor 17 is blocked by the light-blocking plate 16, to determine whether the light-blocking plate 16 is located at a position at which the light-blocking plate 16 faces the reference position sensor 17. As described above, the first sensor 10A and the second sensor 10B move in synchronized manner, thus the reference position sensor 17 directly detects whether the second sensor 10B is located at a reference position and indirectly detects whether the first sensor 10A is located at a reference position. Note that in the detection device 3 of Example 1, the reference position sensor 17 is provided downward to directly detect whether the second sensor 10B is located at the reference position, and the reference position sensor 17 may also be provided upward to directly detect whether the first sensor 10A is located at the reference position.

To once summarize herein, the detection device 3 of Example 1 includes the first belt 7A stretched over the first pulley 9A and the second pulley 9B, where the first sensor 10A is fixed to the first belt 7A, and the second belt 7B stretched over the third pulley 9C and the fourth pulley 9D to be arranged parallel to the first belt 7A, where the second sensor 10B is fixed to the second belt 7B, as illustrated in FIG. 3, and the like. The detection device 3 further includes the drive motor 12 as a drive unit configured to generate a driving force for moving the first belt 7A and the second belt 7B, the first rotation shaft 11A configured to transmit the driving force of the drive motor 12 to the first pulley 9A, where the first pulley 9A is fixed to the first rotation shaft 11A, the second rotation shaft 11B configured to transmit the driving force of the drive motor 12 to the third pulley 9C, where the third pulley 9C is fixed to the second rotation shaft 11B, and the coupling unit 13 configured to couple the first rotation shaft 11A with the second rotation shaft 11B in the axial direction D. Further, the coupling unit 13 is configured to make the first rotation shaft 11A and the second rotation shaft 11B rotatable, that is, the coupling unit 13 is configured to adjust an angle as viewed from the axial direction D of at least one of the first rotation shaft 11A and the second rotation shaft 11B.

As described above, in the detection device 3 of Example 1, the first rotation shaft 11A configured to move the first belt 7A to which the first sensor 10A is fixed and the second rotation shaft 11B configured to move the second belt 7B to which the second sensor 10B is fixed, are configured to be adjustable in angles as viewed from the axial direction D. This allows the detection device 3 of Example 1 to adjust a relative position between the first sensor 10A and the second sensor 10B. Accordingly, in the detection device 3 of Example 1, the relative position between the first sensor 10A and the second sensor 10B can be adjusted to suppress an error and the like in mark detection results of the first sensor 10A and the second sensor 10B, for example. Note that it suffices that the above-described term "parallel" represent substantially parallel.

Further, as described above, the detection device 3 of Example 1, by the provision of the reference position sensor 17 to serve as a reference for a positional adjustment of the first sensor 10A and the second sensor 10B, is configured to dispose the first sensor 10A and the second sensor 10B at particularly preferred positions. This allows the detection device 3 of Example 1 to suppress an error in the detection results of the first sensor 10A and the second sensor 10B in a particularly effective manner.

Note that in the detection device 3 of Example 1, the first pulley 9A and the third pulley 9C, and attachment positions for the first pulley 9A and the third pulley 9C are to be attached, respectively, are each provided with a flat portion, where the first pulley 9A is attached to the attachment position for the first pulley 9A with the flat portions facing each other, and the third pulley 9C is attached to the attachment position for the third pulley 9C with the flat portions facing each other.

As described above, in the detection device 3 of Example 1, the first pulley 9A and the third pulley 9C are attached to the corresponding attachment positions of the first pulley 9A and the third pulley 9C, respectively, with the flat portions facing each other. Accordingly, in the detection device 3 of Example 1, for example, one of the first pulley 9A or the third pulley 9C is prevented from being inadvertently rotated relative to the rotation shaft 11, to thus suppress an occurrence of an error in the detection results of the first sensor 10A and the second sensor 10B.

In addition, as described above, the coupling unit 13 of Example 1 includes the first screw 14A for fixing the first rotation shaft 11A to the coupling unit 13, and the second screw 14B for fixing the second rotation shaft 11B to the coupling unit 13. Further, the first screw 14A is unfastened to adjust an angle as viewed from the axial direction D of the first rotation shaft 11A with respect to the coupling unit 13, while the second screw 14B is unfastened to adjust an angle as viewed from the axial direction D of the second rotation shaft 11B with respect to the coupling unit 13.

As described above, in the coupling unit 13 of Example 1, the angles as viewed from the axial direction D of the first rotation shaft 11A and the second rotation shaft 11B with respect to the coupling unit 13 can be individually adjusted with the first screw 14A and the second screw 14B. This allows the detection device 3 of Example 1 to move one of the first sensor 10A or the second sensor 10B without inadvertently moving the other. Note that although the first screw 14A and the second screw 14B of Example 1 are so-called hexagon socket set screws, the first screw 14A and the second screw 14B may not be hexagon socket set screws.

The present disclosure is not limited to the printing apparatus 1 and the detection device 3 including the coupling unit 13 having such a configuration. A detection device 3 including a coupling unit 13 having another configuration will be described below with reference to FIG. 6.

EXAMPLE 2 (FIG. 6)

Figure 6:
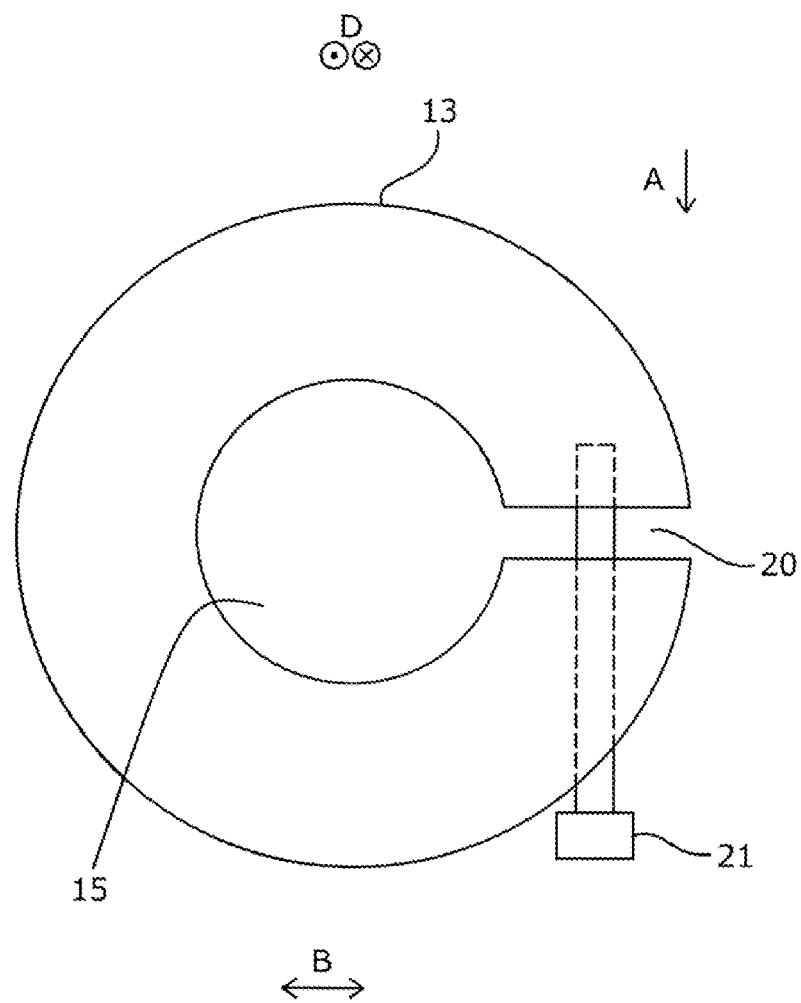
FIG. 6 is a schematic view as viewed from an axial direction of a coupling unit of a detection device in a printing apparatus according to Example 2 of the present disclosure.

FIG. 6 is a schematic view illustrating a coupling unit 13 of a detection device 3 in a printing apparatus 1 of Example 2. Here, the printing apparatus 1 and the detection device 3 of Example 2 have configurations identical to the configurations of the printing apparatus 1 and the detection device 3 of Example 1, excluding the coupling unit 13. Accordingly, descriptions of the portions having common configuration, such as portions other than the coupling unit 13, are not given. Note that like reference signs designate component members common with Example 1 described above, and detailed description for such component members are not given.

As illustrated in FIG. 6, the coupling unit 13 in the detection device 3 of Example 2 also includes a hole portion 15 having a cylindrical shape into which the first rotation shaft 11A and the second rotation shaft 11B are insertable, as in the coupling unit 13 of the detection device 3 of Example 1. Further, as illustrated in FIG. 6, the coupling unit 13 of Example 2 is C-shaped when viewed from a direction in which the first rotation shaft 11A and the second rotation shaft 11B are inserted into the hole portion 15. In addition, the coupling unit 13 includes a screw 21 configured to adjust a gap at a gap portion 20 and a diameter of the hole portion 15 in the C-shaped portion. In other words, the coupling unit 13 of Example 2 includes the screw 21 for fixing the first rotation shaft 11A and the second rotation shaft 11B to the coupling unit 13. The coupling unit 13 is configured such that the screw 21 is unfastened to adjust angles as viewed from the axial direction D of the first rotation shaft 11A and the second rotation shaft 11B with respect to the coupling unit 13.

The coupling unit 13 of Example 2 thus configured makes it possible to fasten one piece of the screw 21 to fix the first rotation shaft 11A and the second rotation shaft 11B with ease, and makes it possible to unfasten the one piece of the screw 21 to adjust the angles as viewed from the axial direction D of the first rotation shaft 11A and the second rotation shaft 11B. That is, the detection device 3 of Example 2 has a user-friendly configuration in which one piece of the screw 21 is fastened/unfastened to move the first sensor 10A and the second sensor 10B.

EXAMPLE 3 (FIGS. 7 AND 8)

The detection devices 3 of the printing apparatuses 1 of Example 1 and Example 2 are configured to include the coupling unit 13 in which a screw is fastened to fix the first rotation shaft 11A and the second rotation shaft 11B and the screw is unfastened to make the first rotation shaft 11A and the second rotation shaft 11B rotatable. However, the detection device 3 of the present disclosure is not limited to a configuration including the coupling unit 13. Accordingly, a detection device 3 of a printing apparatus 1 of Example 3, which is devoid of the coupling unit 13 and is configured to adjust a relative position between the first sensor 10A and the second sensor 10B, will be described below with reference to FIGS. 7 and 8. Among the figures, FIG. 8 is a front view illustrating one side in the width direction B of the detection device 3 in the printing apparatus 1 of Example 3, which corresponds to FIG. 3 of the printing apparatus 1 of Example 1. Here, the printing apparatus 1 of Example 3 has a configuration identical to the configurations of the printing apparatuses 1 of Example 1 and Example 2, excluding the detection device 3, and thus descriptions of the portions having common configuration, such as portions other than the detection device 3, are not given. Note that like reference signs designate component members common with Example 1 and Example 2 described above, and detailed description for such component members are not given.

Figure 7:
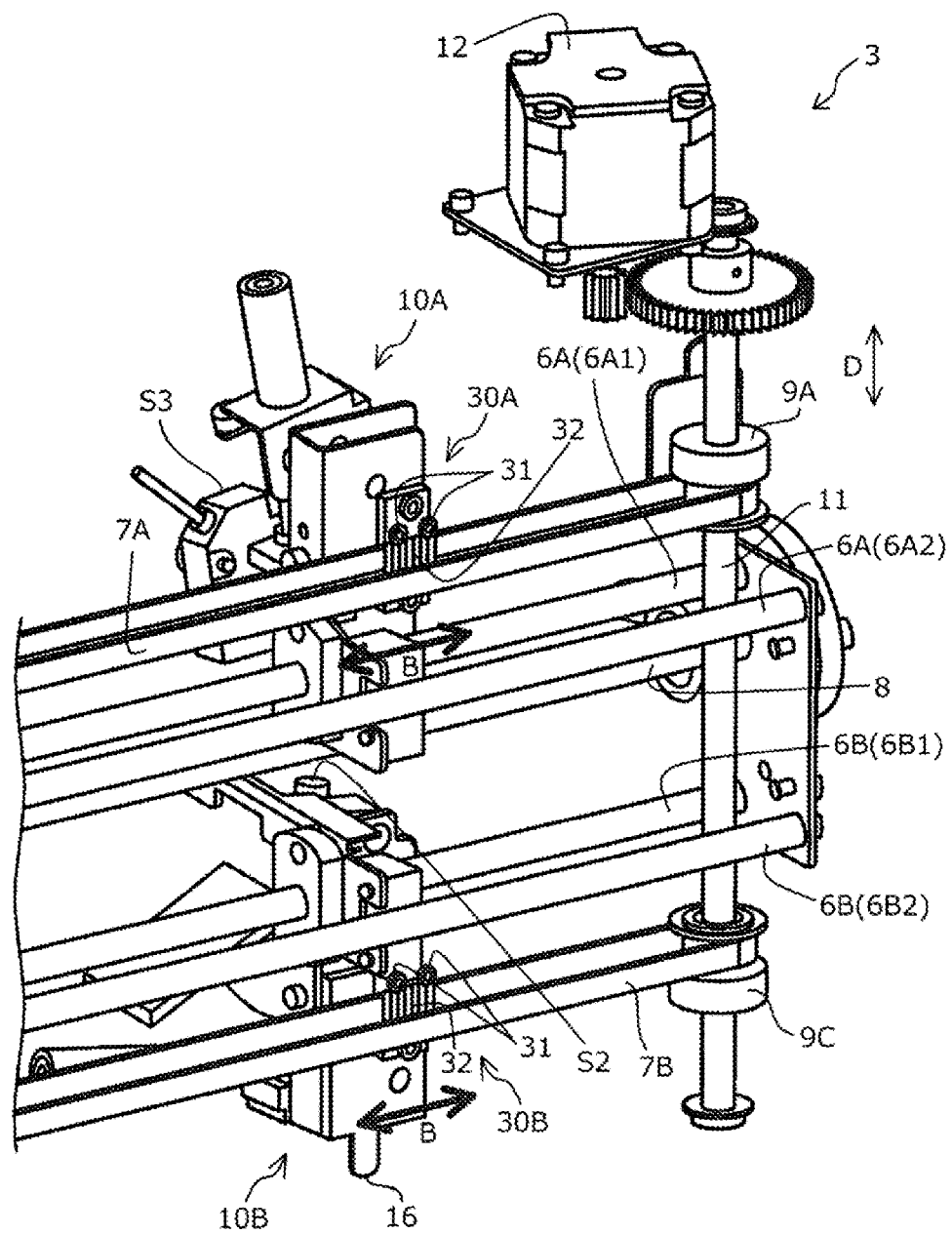
FIG. 7 is a perspective view illustrating the other side in a width direction of a detection device in a printing apparatus according to Example 3 of the present disclosure.
Figure 8:
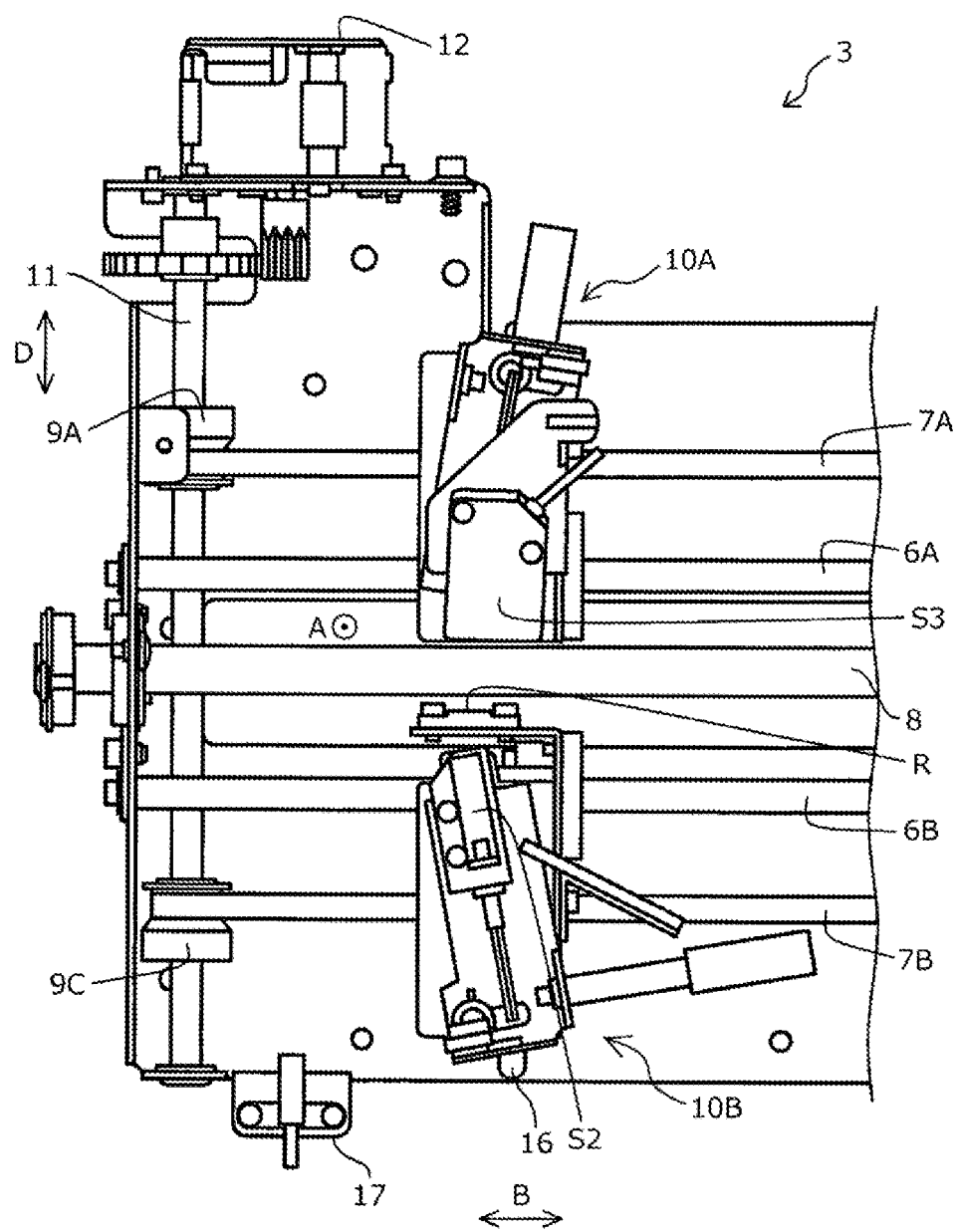
FIG. 8 is a front view illustrating one side in a width direction of a detection device in a printing apparatus according to Example 3 of the present disclosure.

As illustrated in FIGS. 7 and 8, the detection device 3 of Example 3 includes one piece of rotation shaft 11 devoid of the coupling unit 13 as the rotation shaft 11 on one side in the width direction B of the detection device 3, where the first pulley 9A and the third pulley 9C are fixed to the rotation shaft 11. Further, as illustrated in FIG. 7, a first interposition unit 30A is provided between the first sensor 10A and the first belt 7A, and a second interposition unit 30B is provided between the second sensor 10B and the second belt 7B. The first intervening portion 30A includes a belt holding portion 32 and a screw 31, where the screw 31 is fastened to fix the first sensor 10A to the first belt 7A, and the screw 31 is unfastened to move the first sensor 10A in an extending direction of the first belt 7A with respect to the first belt 7A. Similarly, the second interposition unit 30B includes a belt holding portion 32 and a screw 31, where the screw 31 is fastened to fix the second sensor 10B to the second belt 7B, and the screw 31 is unfastened to move the second sensor 10B in an extending direction of the second belt 7B with respect to the second belt 7B.

To summarize, the detection device 3 of Example 3 includes the first belt 7A stretched over the first pulley 9A and the second pulley 9B, where the first belt 7A is provided with the first sensor 10A with the first interposition unit 30A interposed therebetween, and the second belt 7B stretched over the third pulley 9C and the fourth pulley 9D to be arranged in parallel to the first belt 7A, where the second belt 7B is provided with the second sensor 10B with the second interposition unit 30B interposed therebetween. The detection device 3 further includes a drive motor 12 configured to generate a driving force for moving the first belt 7A and the second belt 7B, and a rotation shaft 11 configured to transmit the driving force to the first pulley 9A and the third pulley 9C, where the first pulley 9A and the third pulley 9C are fixed to the rotation shaft 11. Further, the first interposition unit 30A is configured to adjust a position of the first sensor 10A in the extending direction of the first belt 7A, and the second interposition unit 30B is configured to adjust a position of the second sensor 10B in the extending direction of the second belt 7B.

As in the detection device 3 of Example 3, the first interposition unit 30A is configured to adjust a position of the first sensor 10A in the extending direction of the first belt 7A, the second interposition unit 30B is configured to adjust a position of the second sensor 10B in the extending direction of the second belt 7B, or the first interposition unit 30A is configured to adjust a position of the first sensor 10A in the extending direction of the first belt 7A and the second interposition unit 30B is configured to adjust a position of the second sensor 10B in the extending direction of the second belt 7B, thus, the position of the first sensor 10A is adjusted with the first interposition unit 30A, the position of the second sensor 10B is adjusted with the second interposition unit 30B, or the position of the first sensor 10A is adjusted with the first interposition unit 30A and the position of the second sensor 10B is adjusted with the second interposition unit 30B, to thus adjust a relative position between the first sensor 10A and the second sensor 10B. Accordingly, the relative position between the first sensor 10A and the second sensor 10B can be adjusted to suppress an error in the detection results of the first sensor 10A and the second sensor 10B.

However, as in the detection device 3 of Example 3, it is particularly preferred that the first interposition unit 30A is configured to adjust a position of the first sensor 10A in the extending direction of the first belt 7A and the second interposition unit 30B is configured to adjust a position of the second sensor 10B in the extending direction of the second belt 7B. This is because such a configuration allows the first interposition unit 30A to adjust a position of the first sensor 10A, and allows the second interposition unit 30B to adjust a position of the second sensor 10B, to thus adjust a relative position between the first sensor 10A and the second sensor 10B with high accuracy.

EXAMPLE 4 (FIG. 9)

Figure 9:
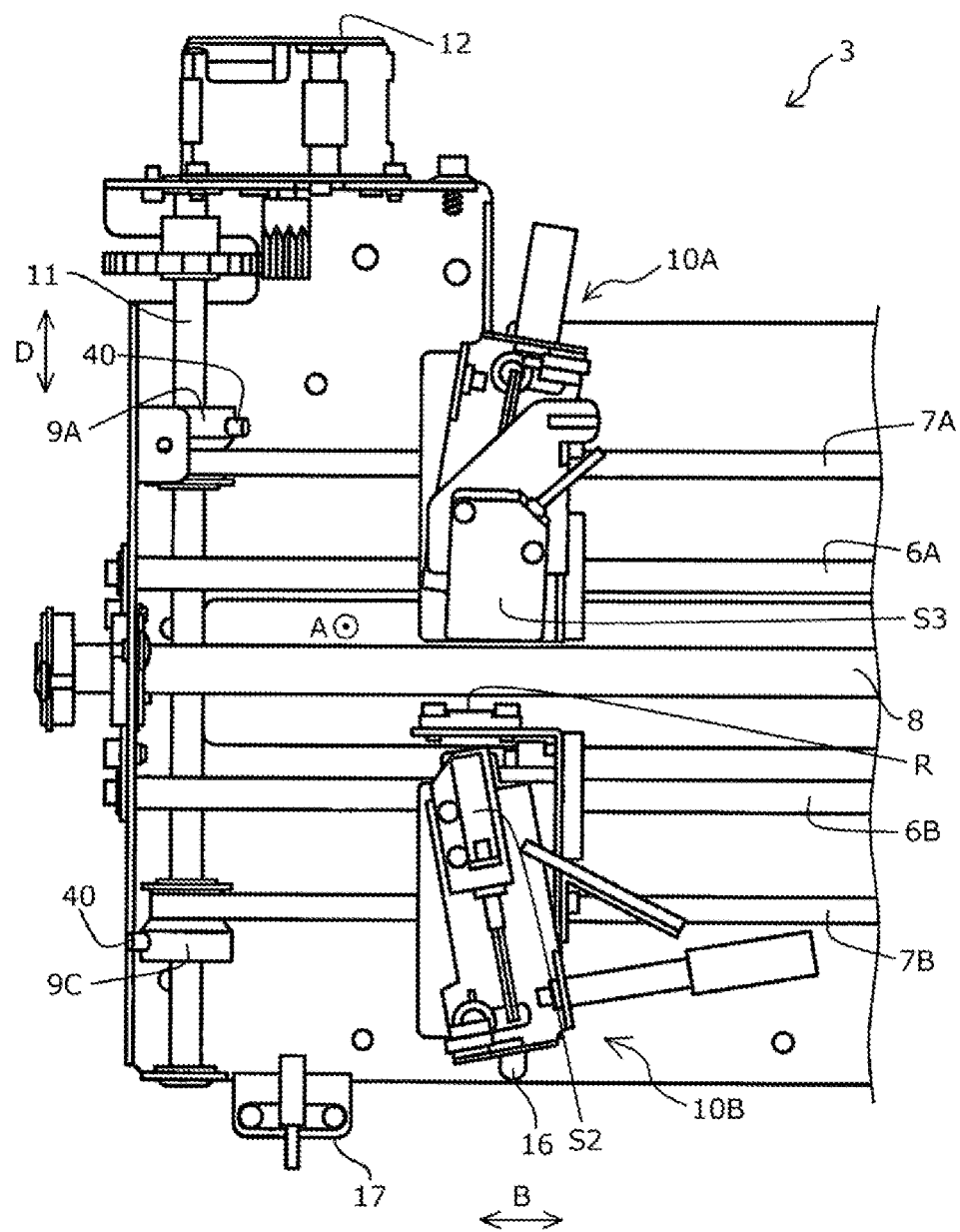
FIG. 9 is a front view illustrating one side in a width direction of a detection device in a printing apparatus according to Example 4 of the present disclosure.

A detection device 3 of a printing apparatus 1 of Example 4 is configured to be devoid of the coupling unit 13 as in the detection device 3 of the printing apparatus 1 of Example 3. The detection device 3 of the printing apparatus 1 of Example 4 will be described below with reference to FIG. 9. FIG. 9 is a front view illustrating one side in the width direction B of the detection device 3 in the printing apparatus 1 of Example 4, which corresponds to FIG. 3 of the printing apparatus 1 of Example 1 and FIG. 8 of the printing apparatus 1 of Example 3. The printing apparatus 1 of Example 4 has a configuration identical to the configurations of the printing apparatuses 1 of Example 1 to Example 3, excluding the detection device 3, and thus descriptions of the portions having common configuration, such as portions other than the detection device 3, are not given. Note that like reference signs designate component members common with Example 1 to Example 3 described above, and detailed description for such component members are not given.

In the detection device 3 of Example 4, no flat portion is provided on both the rotation shaft 11 on one side in the width direction B and the rotation shaft 11 on the other side in the width direction B, and no flat portion is provided on any of the first pulley 9A, the second pulley 9B, the third pulley 9C, and the fourth pulley 9D. Further, as illustrated in FIG. 9, the first pulley 9A and the third pulley 9C are provided with a screw 40, which is hexagon socket set screw, where the screw 40 is fastened to fix the first pulley 9A and the third pulley 9C to the rotation shaft 11, and the screw 40 is unfastened to make the first pulley 9A and the third pulley 9C rotatable with respect to the rotation shaft 11. Note that the second pulley 9B and the fourth pulley 9D have a configuration as in the first pulley 9A and the third pulley 9C.

To summarize, the detection device 3 of Example 4 includes the first belt 7A stretched over the first pulley 9A and the second pulley 9B, where the first sensor 10A is fixed to the first belt 7A, and the second belt 7B stretched over the third pulley 9C and the fourth pulley 9D to be arranged in parallel to the first belt 7A, where the second sensor 10B is fixed to the second belt 7B. The detection device 3 further includes the drive motor 12 configured to generate a driving force for moving the first belt 7A and the second belt 7B, and the rotation shaft 11 configured to transmit the driving force of the drive motor 12 to the first pulley 9A and the third pulley 9C, where the first pulley 9A and the third pulley 9C are fixed to the rotation shaft 11. Further, the first pulley 9A is configured to be, with respect to the rotation shaft, in a fixed state and in an angle adjustable state in which an angle as viewed from the axial direction D is adjustable, and the third pulley 9C is configured to be, with respect to the rotation shaft, in a fixed state and in an angle adjustable state in which an angle as viewed from the axial direction D is adjustable.

As in the detection device 3 of Example 4, the first pulley 9A is configured to be, with respect to the rotation shaft, in a fixed state and in an angle adjustable state in which an angle as viewed from the axial direction D is adjustable, the third pulley 9C is configured to be, with respect to the rotation shaft, in a fixed state and in an angle adjustable state in which an angle as viewed from the axial direction D is adjustable, or the first pulley 9A is configured to be, with respect to the rotation shaft, in a fixed state and in an angle adjustable state in which an angle as viewed from the axial direction D is adjustable and the third pulley 9C is configured to be, with respect to the rotation shaft, in a fixed state and in an angle adjustable state in which an angle as viewed from the axial direction D is adjustable, thus, the first pulley 9A is caused to rotate relative to the rotation shaft 11, the third pulley 9C is caused to rotate relative to the rotation shaft 11, or the first pulley 9A is caused to rotate relative to the rotation shaft 11 and the third pulley 9C is caused to rotate relative to the rotation shaft 11, to thus adjust a relative position between the first sensor 10A and the second sensor 10B. Accordingly, the relative position between the first sensor 10A and the second sensor 10B can be adjusted to suppress an error in the detection results of the first sensor 10A and the second sensor 10B.

However, it is particularly preferred that, as in the detection device 3 of Example 4, the first pulley 9A is configured to be, with respect to the rotation shaft, in a fixed state and in an angle adjustable state in which an angle as viewed from the axial direction D is adjustable, and the third pulley 9C is configured to be, with respect to the rotation shaft, in a fixed state and in an angle adjustable state in which an angle as viewed from the axial direction D is adjustable. This is because such a configuration allows the first pulley 9A to rotate relative to the rotation shaft 11, and allows the third pulley 9C to rotate relative to the rotation shaft 11, to thus adjust a relative position between the first sensor 10A and the second sensor 10B with high accuracy.

Note that the present disclosure is not limited to the above-described examples, and many variations are possible within the scope of the disclosure as described in the appended claims. It goes without saying that such variations also fall within the scope of the disclosure.

What is claimed is:

1. A detection device comprising:
   a first belt stretched over a first pulley and a second pulley, a first sensor being fixed to the first belt;
   a second belt stretched over a third pulley and a fourth pulley to be arranged in parallel to the first belt, a second sensor being fixed to the second belt;
   a drive unit configured to generate a driving force for moving the first belt and the second belt;
   a first rotation shaft configured to transmit the driving force to the first pulley, the first pulley being fixed to the first rotation shaft;

a second rotation shaft configured to transmit the driving force to the third pulley, the third pulley being fixed to the second rotation shaft; and a coupling unit configured to couple the first rotation shaft with the second rotation shaft in an axial direction, wherein the coupling unit is configured to adjust an angle, as viewed from an axial direction, of at least one of the first rotation shaft and the second rotation shaft.

2. The detection device according to claim 1, wherein the coupling unit includes a screw for fixing the first rotation shaft and the second rotation shaft to the coupling unit, and the coupling unit is configured such that angles, as viewed from the axial direction, of the first rotation shaft and the second rotation shaft with respect to the coupling unit is adjustable when the screw is unfastened.

3. The detection device according to claim 1, wherein the coupling unit includes a first screw for fixing the first rotation shaft to the coupling unit and a second screw for fixing the second rotation shaft to the coupling unit, and the coupling unit is configured such that an angle, as viewed from the axial direction, of the first rotation shaft with respect to the coupling unit is adjustable when the first screw is unfastened, and such that an angle, as viewed from the axial direction, of the second rotation shaft with respect to the coupling unit is adjustable when the second screw is unfastened.

4. The detection device according to claim 1, comprising a reference position sensor configured to serve as a reference for a positional adjustment of the first sensor and the second sensor.

5. The detection device according to claim 1, wherein the first pulley and the third pulley, and attachment positions for the first pulley and the third pulley are each provided with a flat portion, wherein the first pulley is attached to the attachment position for the first pulley with the flat portions facing each other, and the third pulley is attached to the attachment position for the third pulley with the flat portions facing each other.

6. A printing apparatus, comprising:
a detection device according to claim 1; and
a printing unit configured to perform printing onto a medium on which a detection operation is performed with the detection device.

7. A detection device comprising:
a first belt stretched over a first pulley and a second pulley, the first belt being provided with a first sensor with a first interposition unit interposed therebetween;
a second belt stretched over a third pulley and a fourth pulley to be arranged in parallel to the first belt, the second belt being provided with a second sensor with a second interposition unit interposed therebetween;
a drive unit configured to generate a driving force for moving the first belt and the second belt; and
a rotation shaft configured to transmit the driving force to the first pulley and the third pulley, the first pulley and the third pulley being fixed to the rotation shaft,
wherein the detection device has at least one of: a structure in which the first interposition unit is configured to adjust a position of the first sensor in an extending direction of the first belt, and a structure in which the second interposition unit is configured to adjust a position of the second sensor in an extending direction of the second belt.

8. The detection device according to claim 7, wherein the detection device has the structure in which the first interposition unit is configured to adjust the position of the first sensor in the extending direction of the first belt, and the structure in which the second interposition unit is configured to adjust the position of the second sensor in the extending direction of the second belt.

9. A detection device comprising:
a first belt stretched over a first pulley and a second pulley, a first sensor being fixed to the first belt;
a second belt stretched over a third pulley and a fourth pulley to be arranged in parallel to the first belt, a second sensor being fixed to the second belt;
a drive unit configured to generate a driving force for moving the first belt and the second belt; and
a rotation shaft configured to transmit the driving force to the first pulley and the third pulley, the first pulley and the third pulley being fixed to the rotation shaft, wherein
the detection device has at least one of: a structure in which the first pulley is configured to be in a state of being fixed to the rotation shaft and a state where an angle as viewed from an axial direction is adjustable; and
a structure in which the third pulley is configured to be in a state of being fixed to the rotation shaft and a state where an angle as viewed from the axial direction is adjustable.

10. The detection device according to claim 9, wherein the detection device has a structure in which the first pulley is configured to be in the state of being fixed to the rotation shaft and the state where the angle as viewed from the axial direction is adjustable, and in which the third pulley is configured to be in the state of being fixed to the rotation shaft and the state where the angle as viewed from the axial direction is adjustable.

* * * * *